United States Patent [19]

Chagnon

[11] Patent Number: 5,749,322

[45] Date of Patent: May 12, 1998

[54] ANIMAL STALL

[76] Inventor: Florent Chagnon, 2133 rue Principale, St. Dominique, Quebec, Canada, JOH 1L0

[21] Appl. No.: 838,437

[22] Filed: Apr. 7, 1997

[51] Int. Cl.$^6$ .................................................. A01K 1/02
[52] U.S. Cl. ........................................................ 119/509
[58] Field of Search .................................. 119/502, 503, 119/504, 509, 512, 513, 516, 519, 525, 527, 528, 529, 530

[56] References Cited

U.S. PATENT DOCUMENTS

| 385,149 | 6/1888 | Stowe | 119/525 |
|---|---|---|---|
| 1,560,160 | 11/1925 | Hebert | 119/525 |
| 3,084,668 | 4/1963 | McMurray et al. | 119/503 |
| 4,345,547 | 8/1982 | Lynch | 119/503 |
| 4,782,822 | 11/1988 | Ricken | 119/525 |

*Primary Examiner*—Thomas Price
*Attorney, Agent, or Firm*—Eric Fincham

[57] ABSTRACT

A farrowing pen having a floor which has a perimeter area and a central area, the central area having a plurality of elongated flooring members spaced apart with at least one slat extending between each of the elongated flooring members, and a biased retaining apparatus for urging slats into a position wherein at least a portion of the slats are above the generally horizontal plane of the floor to thereby provide a flooring surface in the central portion having a ribbed effect. The ribbed floor will discourage the sow from lying down and thus crushing the piglets.

9 Claims, 2 Drawing Sheets

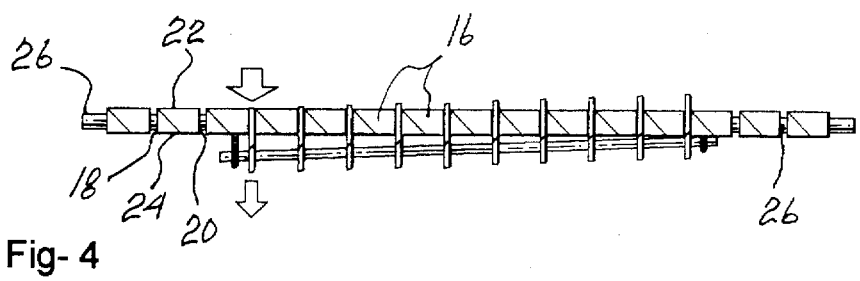
Fig- 4
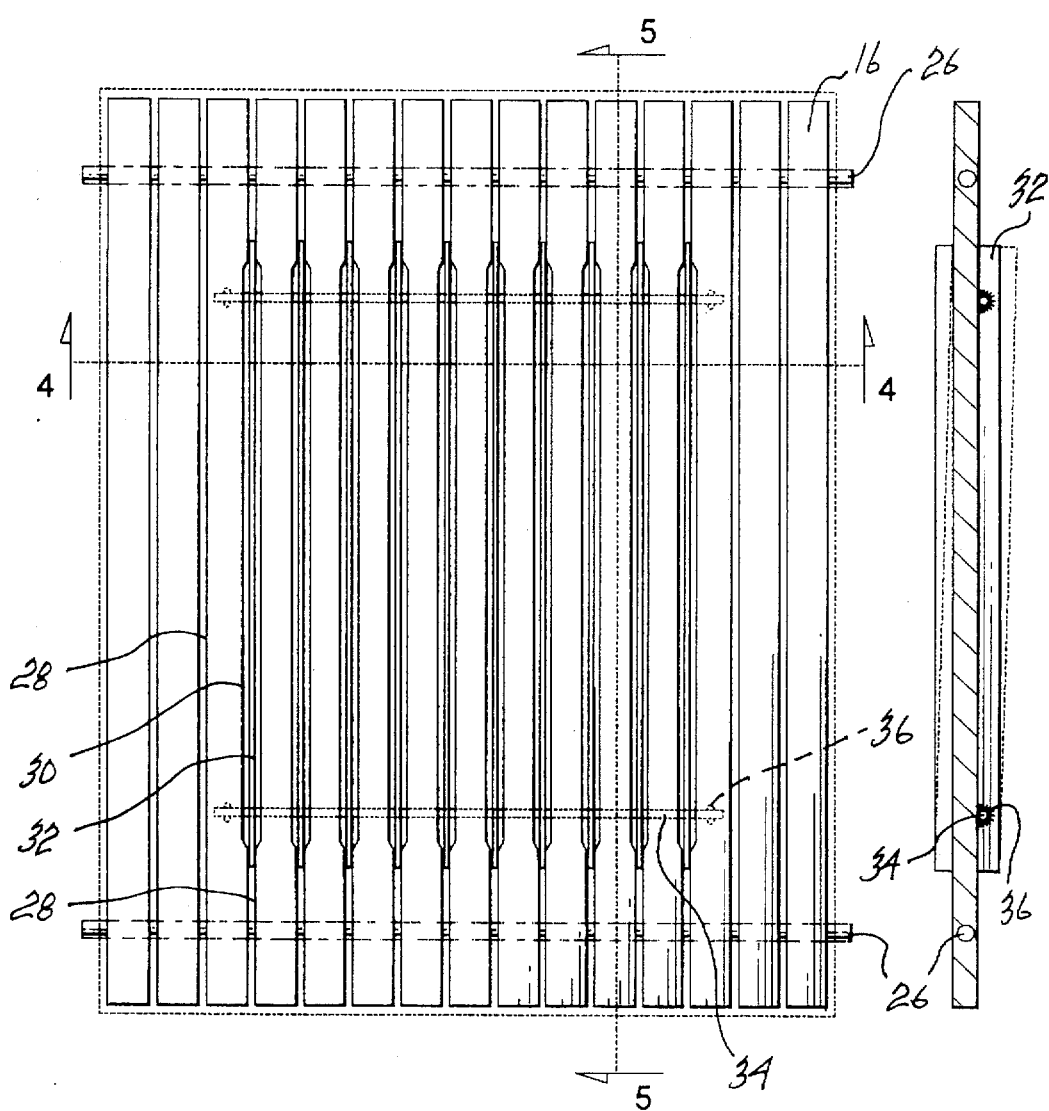
Fig- 3
Fig- 5

ANIMAL STALL

BACKGROUND OF THE INVENTION

The present invention relates to farrowing pens and more particularly, relates to an apparatus and a method for protecting pre-weaned piglets.

Pre-weaned pig mortality, as a result of being crushed by the sow in a farrowing area, can account for up to 10% loss of all pre-weaned pigs. The problem arises as the sow, in the farrowing area, attempts to lie down and/or change position and as a result, the piglets are crushed.

In order to overcome the above problem there have been many suggested solutions. Generally, these solutions have ranged from the use of restraining side bars in the farrowing area to further restrict the movement of the sow or to slow the descent of the sow as she lies down.

Thus, it has been proposed in the art that one utilize compressed air to urge baby piglets to a safe area away from the sow. Such an arrangement is shown in U.S. Pat. No. 5,233,940 wherein the patentee teaches that the farrowing area has a safety zone where the sow can not sit. The bursts of air delivered by air nozzles are under the control of a controller which opens and closes an air solenoid and which controller is activated by a movement of the sow. Thus, when the sow moves, the sensor switch activates the controller to send bursts of air to urge the piglets to the safety zone.

A further arrangement is shown in U.S. Pat. No. 4,793,287 wherein a safety zone is shown for the piglets, the safety zone being a lateral floor section on the perimeter of the main floor. Lifting and lowering means are provided for moving the lateral floor sections to different levels.

A still further arrangement is shown in U.S. Pat. No. 5,099,793 which teaches a farrowing shed having first and second compartments, one for the farrowing pigs at the front portion thereof while the rear is a sow compartment. The two compartments are separated by a divider to prevent crushing of the piglets by the sow.

To date, to the best knowledge of the applicant, these devices and methods have not received a strong degree of commercial acceptance and there still remains the need for protecting the piglets from the mother sow.

SUMMARY OF THE INVENTION

It is an object of the present invention a farrowing pen structure to reduce the instance of piglet death due to crushing by the sow.

It is a further object of the present invention to provide a floor structure suitable for a farrowing pen and which floor structure helps to reduce piglet crushing while permitting the draining of waste.

It is a further object of the present invention to provide a method and an apparatus to protect pre-weaned piglets.

According to one aspect of the present invention there is provided a farrowing pen comprising a floor and a wall, at least a portion of the floor lying in a generally horizontal plane, the floor having at least one aperture formed therein, a member having a first end moveable in a generally vertical direction through the aperture from a first position wherein the first end lies substantially coplanar with the horizontal plane to a second position wherein the first end lies in a plane above the horizontal plane.

According to a further aspect of the present invention there is provided a farrowing pen, the farrowing pen having a floor and at least one wall, the floor comprising a perimeter area and a central area, the central area comprising a plurality of elongated flooring members, the flooring members extending in a substantially parallel spaced relationship in a generally horizontal plane to each other and having spaces therebetween, a plurality of slats, each slat being sized to fit within one of the spaces, and biased retaining means for retaining the slats in the spaces, the biased retaining means urging the slats into a position wherein at least a portion of the slats are above the generally horizontal plane to thereby provide a flooring surface in the central portion having a ribbed effect.

In a greater detail, the floor structure of the present invention may be used in any location wherein it is desired to prevent the sow from lying down. In most instances, this will be in the so-called farrowing station or pen though other structures may also benefit from the practice of the present invention.

According to the present invention, there is provided a floor which has a plurality of openings formed therein. As such, the floor may be manufactured of any suitable material and have any desired form so long as it is capable of supporting the necessary weight. As such, the floor could be formed of concrete, a metallic material, wood, or plastics. A particularly preferred arrangement is the use of a recycled plastic material.

The floor, as above mentioned, is foraminous in nature and to this end, various types of openings may be provided. The openings are designed to permit a moveable member to move in a substantially vertical fashion to render the same uncomfortable for the sow to lie down. Preferably, the openings are also designed to permit drainage of waste from the pen to a lower level wherein the wastes are collected.

In one preferred embodiment, the floor is formed of a plurality of longitudinally extending flooring members, each flooring member being spaced apart from an adjacent flooring member to provide a longitudinally extending space or channel therebetween. One or more slats are designed to fit within each of the slots, each of the slats being urged upwardly to a position such that at least a portion of the slat lies above the general plane of the floor.

In the above arrangement, one could employ many different shapes of openings in the floor utilizing a member which is biased to move upwardly through the floor opening to lie in a plane above the horizontal plane of the floor to thereby render the same uncomfortable for the sow to lie down on.

The means for biasing the members upwardly may vary and it is within the knowledge of those skilled in the art to utilize many different biasing means. Preferably, spring biasing means are utilized.

BRIEF DESCRIPTION OF THE DRAWINGS

Having thus generally described the invention, reference will be made to the accompanying drawings illustrating an embodiment thereof, in which;

FIG. 3 is a top plan view of the floor structure of the farrowing pen;

FIG. 4 is a cross-sectional view taken along the lines 4—4 of FIG. 3; and

FIG. 5 is a sectional view taken along the lines 5—5 of FIG. 3.

DESCRIPTION OF THE PREFERRED EMBODIMENT

Figure 1:
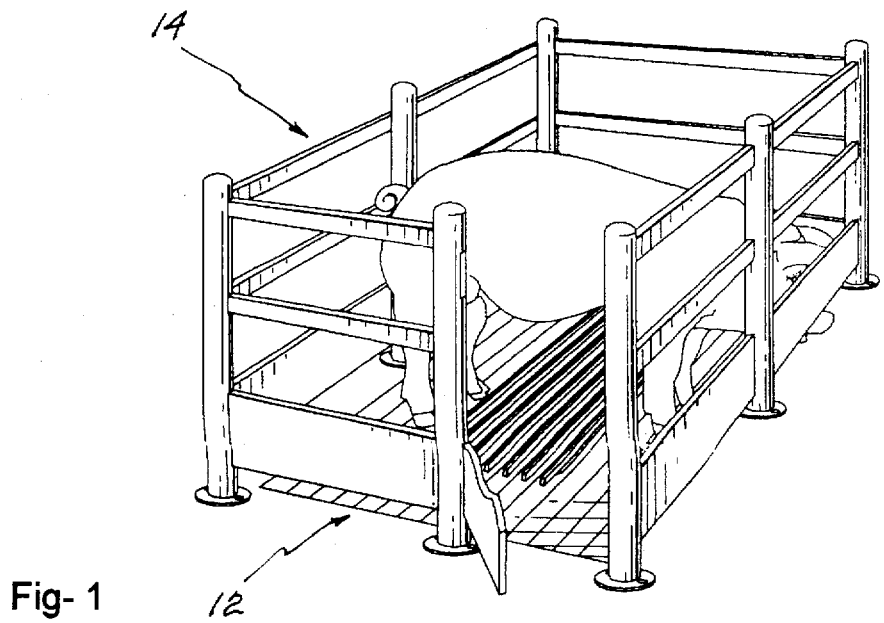
FIG. 1 is a perspective view of a portion of a farrowing station.

Referring to the drawings in a greater detail and by reference characters thereto, there is shown in FIG. 1 a farrowing station which is generally designated by reference numeral 10. Farrowing station 10 includes a floor 12 and walls 14 extending thereabout.

Figure 2:
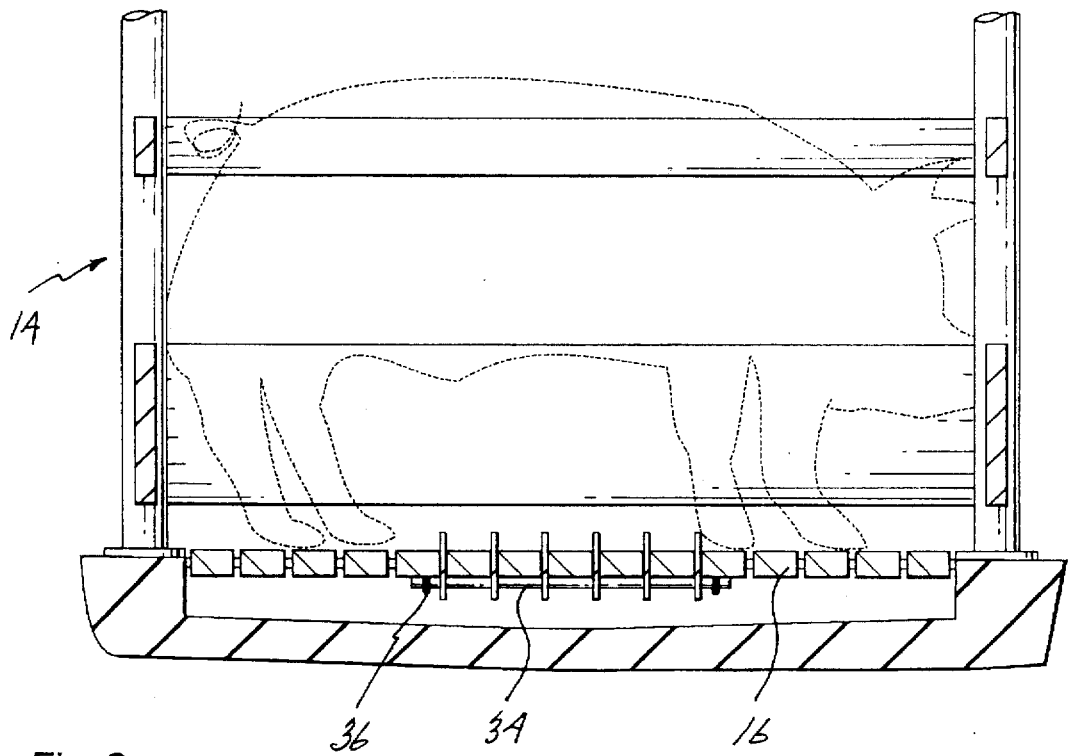
FIG. 2 is a cross-sectional view of the farrowing station in FIG. 1.

Floor 12 is comprised of a plurality of rectangularly configurated flooring members 16. Each flooring member 16 is substantially identical and thus only one will be described herein. As may be best seen in FIGS. 2 and 4, each flooring member 16 has a pair of opposed side walls 18, 20, a top wall 22 and a bottom wall 24. Extending between flooring members 16 are transversely extending support members 26. For assembly purposes, flooring members 26 may have an aperture formed therein to receive transversely extending support members 26.

As will be noted in the drawings, flooring members 16 are spaced apart from each other to provide a plurality of longitudinally extending slots or spaces 28. As illustrated in FIG. 3, slots or spaces 28 have an enlarged portion 30 which is achieved by an arrangement wherein side walls 18 and 20 of flooring members 16 are slightly recessed for a portion of their length.

Mounted intermediate flooring members 16 in spaces 28 are a plurality of slats 32. Slats 32 are connected together by an interconnecting member 34; interconnecting member 34 is mounted to lie adjacent to bottom wall 24 of flooring members 16 by means of a resilient member 36. Resilient member 36 acts to retain slats 32 in the position illustrated in FIGS. 1 and 2 wherein they are extending upwardly above the plane of the top walls 22.

In a preferred embodiment, and as shown in the drawings, the floor arrangement of the present invention is only provided in the central area of the farrowing pen. Thus, the sow can comfortably stand with her feet outside the area while, if she attempts to lie down, the raised slats 32 will interfere and discourage the sow from reclining.

It will be understood that the above described embodiment is for purposes of illustration only and that changes and modifications may be made thereto without departing from the spirit and scope of the invention.

I claim:

1. A farrowing pen comprising a floor and a wall, at least a portion of said floor lying in a generally horizontal plane, said floor having at least one aperture formed therein, a member having a first end moveable in a generally vertical direction through said aperture from a first position wherein said first end lies substantially coplanar with said horizontal plane to a second position wherein said first end lies in a plane above said horizontal plane.

2. A farrowing pen as defined in claim 1 wherein said floor has a plurality of apertures formed therein, each of said apertures having one of said members being moveable in a generally vertical direction.

3. A farrowing pen as defined in claim 1 wherein each of said members is resiliently biased to said second position wherein said first end lies in a plane above said horizontal plane.

4. A farrowing pen as defined in claim 1 wherein said portion of said floor comprises a central portion of said floor.

5. A farrowing pen, said farrowing pen having a floor and at least one wall, said floor comprising a perimeter area and a central area, said central area comprising:

a) a plurality of elongated flooring members, said flooring members extending in a substantially parallel spaced relationship in a generally horizontal plane to each other and having spaces therebetween;

b) a plurality of slats, each slat being sized to fit within one of said spaces; and c) biased retaining means for retaining said slats in said spaces, said biased retaining means urging said slats into a position wherein at least a portion of said slats are above said generally horizontal plane to thereby provide a flooring surface in said central area having a ribbed effect.

6. A farrowing pen as defined in claim 5 wherein said biased retaining means comprises a resilient member.

7. A farrowing pen as defined in claim 5 further including interconnecting members interconnecting said slats, said interconnecting members being mounted to a bottom surface of said flooring members.

8. A farrowing pen as defined in claim 7 wherein said retaining members are secured to said flooring members by a resilient biasing member.

9. A farrowing pen as defined in claim 5 wherein said slats have a width less than the width between said flooring members to thereby permit drainage.

* * * * *